United States Patent [19]

Young

[11] Patent Number: 4,807,864
[45] Date of Patent: Feb. 28, 1989

[54] HAND SURGERY TABLE

[75] Inventor: David A. Young, Ivanhoe, Australia

[73] Assignee: Australian Biomedical Corporation Limited, Australia

[21] Appl. No.: 876,878

[22] PCT Filed: Sep. 17, 1985

[86] PCT No.: PCT/AU85/00227

§ 371 Date: Jul. 16, 1986

§ 102(e) Date: Jul. 16, 1986

[87] PCT Pub. No.: WO86/01711

PCT Pub. Date: Mar. 27, 1986

[51] Int. Cl.$^4$ ............................................. A61G 13/00
[52] U.S. Cl. ........................................ 269/328; 403/2; 403/143; 403/353
[58] Field of Search .................... 269/322, 327, 328; 403/2, 141–143, 349, 353

[56] References Cited

U.S. PATENT DOCUMENTS

| | | | |
|---|---|---|---|
| 2,460,857 | 2/1949 | Sweat | 269/328 |
| 2,612,891 | 10/1952 | Smith | 128/20 |
| 2,621,807 | 12/1952 | Rondich | 269/900 |
| 3,295,518 | 1/1967 | Hazlewood et al. | 269/328 |
| 3,540,719 | 12/1970 | Romney | 269/324 |
| 3,568,263 | 3/1971 | Meehan | 269/903 |
| 3,746,332 | 7/1973 | Hakstian | 269/328 |
| 4,054,282 | 10/1977 | Hamer | 269/328 |
| 4,082,257 | 4/1978 | Strickland | 269/328 |
| 4,174,238 | 11/1979 | Fowles et al. | 403/2 |

FOREIGN PATENT DOCUMENTS 2088216  6/1982  United Kingdom.

Primary Examiner—Frederick R. Schmidt
Assistant Examiner—Judy J. Hartman
Attorney, Agent, or Firm—Stevens, Davis, Miller & Mosher

[57] ABSTRACT

A hand surgery table having a platform (3) and a universal-type joint (6) connecting that platform (3) to a base (5) whereby the disposition of the platform (3) relative to the base (5) can be varied to suit requirements. A lock member (13) is provided to releasably secure the platform (3) in a selected disposition. The platform (3) is releasably connectable to the support structure (2) of the table so that it can be separated for cleaning or disposal, and a frangible detent (26) may be provided to show that the platform (3) has been previously used. A plurality of column supports (41) are attachable to the platform (3) at any of a plurality of positions across the upper surface of the platform (3) and at least some of those supports (41) have a contoured upper end. The column supports (41) cooperate with holes (31) in the platform (3) which also serve as drainage holes.

14 Claims, 5 Drawing Sheets

HAND SURGERY TABLE

This invention relates to a table on which a person's hand can be supported for the purpose of enabling a surgical operation to be carried out on that hand.

Hand surgery tables generally fall into two classes-those which are very simple in construction and those which are complex. The former type do not adequately serve the needs of surgeons because of their inability to support the hand in any of a variety of postures. Examples of that type are disclosed by U.S. Pat. Nos. 3,746,332 and 4,082,257. The latter type are expensive and in spite of their complexity may not provide an adequate variety of hand support positions. Another problem with some of the latter type is that they are difficult to use.

British Pat. No. 2088216 discloses one form of rather complex hand surgery table which has a series of elongate supports which can be rendered rigid or flexible as required and each of which engages a respective finger of the hand to be operated upon. The construction is expensive and is also difficult to use because of the need to separately adjust each of the flexible finger supports.

It is an object of the present invention to provide a hand surgery table of relatively simple construction which enables a hand to be conveniently supported in any one of a variety of dispositions and postures. It is a further object of the invention in a preferred form to provide such a table having a disposable platform.

A hand surgery table according to the invention is characterized in that it includes a primary support platform which can be secured in a variety of positions to achieve a general disposition for a hand placed over that platform, and at least one column support which can be selectively attached to the platform to hold part of the hand in a particular posture relative to the platform. Preferably, there is a plurality of column supports and they may be of various sizes and forms so as to render the table readily adaptable to a variety of situations. In a preferred form, the platform is disposable so that adequate standards of hygiene can be achieved without the need to carefully clean the platform after each use.

According to the present invention there is provided a hand surgery table including, a platform, mounting means for said platform and which is adjustable to permit variation of the disposition of said platform relative to a support, locking means operable to releasably hold said mounting means in a selected position of adjustment, at least one column support releasably attachable to said platform at any one of a plurality of stations provided across said platform, and locating means provided at each said station and each being cooperable with a part of a said column support so as to hold that column support in an operative disposition at which it projects upwardly from an upper surface of said platform.

Although the preceding and subsequent passages of the specification identify the table as a hand surgery table, it is to be understood that it may also have uses in other fields of surgery. For example, the table may be used for foot surgery or for urological surgery. The claims at the end of the specification are to be read accordingly.

The essential features of the invention, and further optional features, are described in detail in the following passages of the specification which refer to the accompanying drawings. The drawings, however, are merely illustrative of how the invention might be put into effect, so that the specific form and arrangement of the features (whether they be essential or optional features) shown is not to be understood as limiting on the invention.

In the drawings:

FIG. 7 is a cross-sectional view taken along line VIII-—VIII of FIG. 6;

Figure 1:
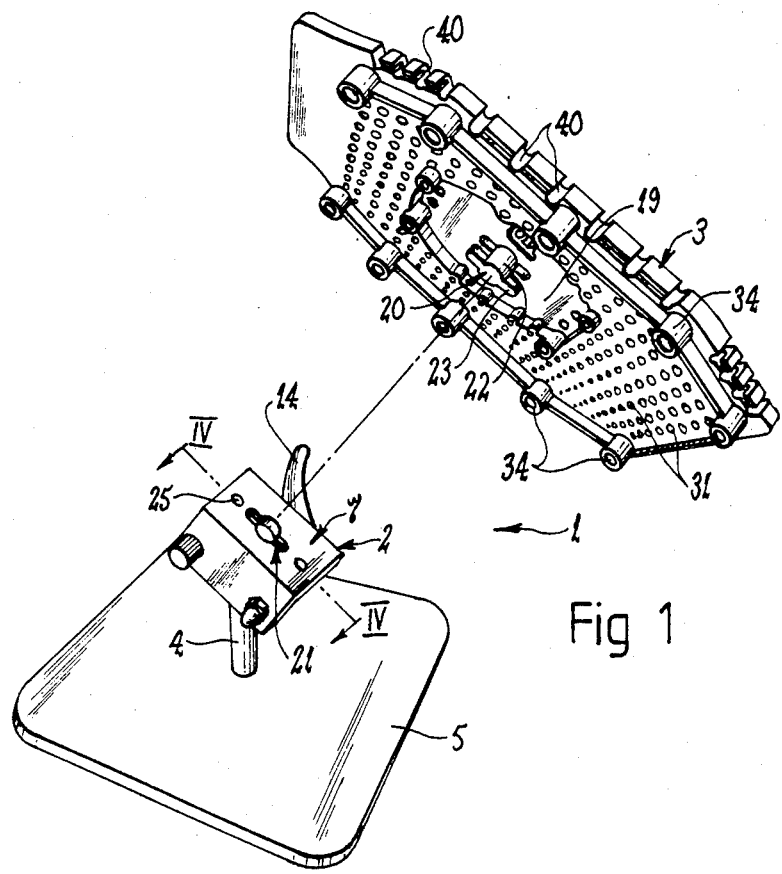
FIG. 1 is a perspective view of one form of table in accordance with the invention and showing the platform separated from mounting structure.

A table 1 according to the invention and as shown in the attached drawings includes an adjustable mounting 2 for the platform 3 so that the disposition of the platform 3 can be varied to suit circumstances. That mounting 2 may be supported on the upper end of a member 4 upstanding from an appropriate base 5, and any suitable means may be adopted for the purpose of the aforementioned adjustment. The member 4 may be long or short according to requirements. According to the arrangement shown, the mounting 2 is connected to the member 4 through a ball joint 6 although any other connection allowing substantially universal relative movement may be used.

The particular mounting 2 as shown includes a substantially flat mounting plate 7 arranged to receive the platform 3 as hereinafter described and having a pair of laterally spaced side walls 8 and 9 depending from a lower surface thereof. One side wall 8 may be fixed to or formed integral with the mounting plate 7, whereas the other wall 9 is arranged for relative movement as hereinafter described. In the example form shown, a spherical enlargement 10 is provided at the upper end of the member 4 and that enlargement 10 is located between the two side walls 8 and 9 of the mounting 2. Preferably, each side wall 8 and 9 has a part-spherical recess 11 in a surface thereof and which receives a respective side part of the spherical enlargement 10 so as to resist separation of the mounting 2 from the member 4, but nevertheless allow pivotal movement of the mounting 2 relative to that member 4. The pivotal movement can be in any direction subject only to limits imposed by fouling between the mounting 2 and the member 4. In the particular arrangement shown, the recess 11 of the wall 8 is formed in a separately formed plate-like component 12 of that wall (see FIG. 3).

Figure 3:
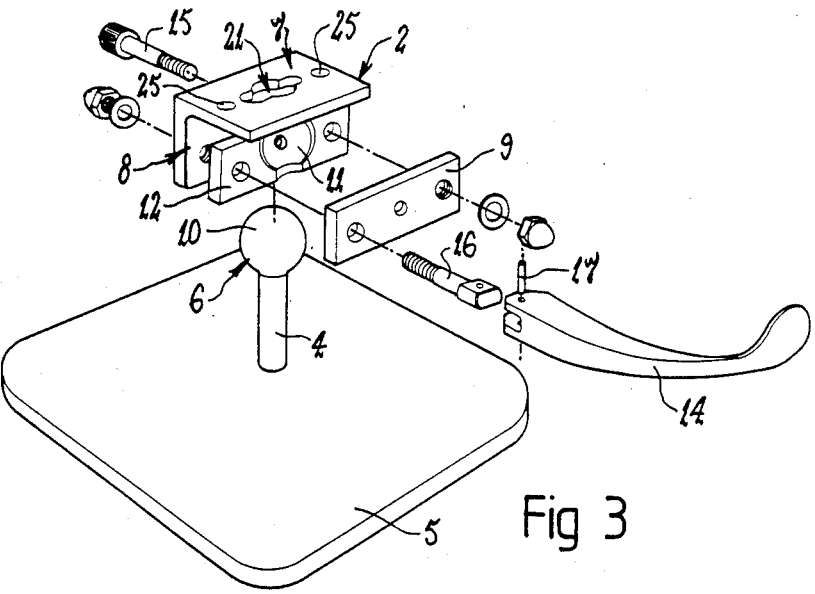
FIG. 3 is an exploded perspective view of the mounting structure of the table shown in FIGS. 1 and 2.
Figure 4:
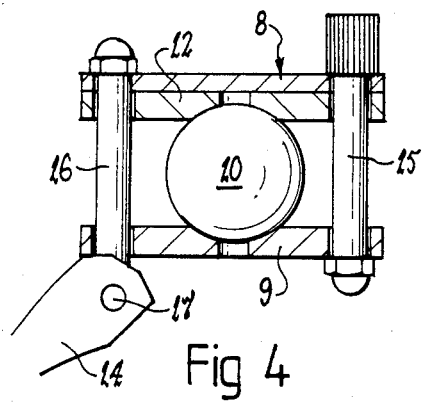
FIG. 4 is a cross-sectional view taken along line IV—IV of FIG. 1 and showing the locking means in the operative condition.
Figure 5:
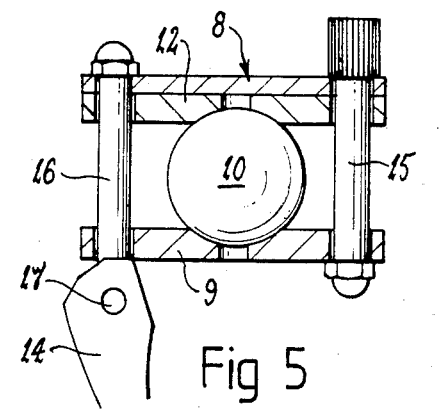
FIG. 5 is a view similar to FIG. 4 but showing the locking means in a release condition.

Locking means 13 is provided for releasably securing the mounting 2 in a selected disposition relative to the member 4. One such means is shown in the drawings and includes a toggle lever 14 which bears against the outside surface of the movable side wall 9 and which can be moved between an operative position (FIG. 4) and an inoperative position (FIG. 5). In the operative position, the toggle lever 14 presses the movable side wall 9 against the spherical enlargement 10 so that the mounting 2 is secured against movement by frictional engagement between that enlargement 10 and the side walls 8 and 9. In the inoperative position, the pressure against the movable side wall 9 is reduced or removed so that the mounting 2 can be moved relative to the member 4. Obviously, other forms of locking means could be adopted to perform the same function. Any suitable means may be employed to retain the movable side wall 9 against complete separation from the remainder of the mounting 2, but in the arrangement shown screws 15 and 16 are used for that purpose. As best shown in FIG. 3, the lever 14 is pivotally connected to the screw 16 through a pin 17.

The platform 3 is adapted to be located over the upper surface 18 (see FIGS. 1 and 3) of the mounting plate 7 and may be secured to the mounting 2 in any suitable fashion. It is preferred, however, that the platform 3 is releasably held on the mounting 2 by conveniently operable retaining means. It is also preferred that the upper surface 18 of the mounting plate 7 is substantially flat and provides a bearing surface for engagement with a cooperable flat part 19 (FIG. 1) of the undersurface of the platform 3. That cooperable flat part 19 may be located substantially in the centre of the platform 3, or at any other suitable location.

According to the arrangement shown, the retaining means includes a keying member 20 which projects from the undersurface of the platform 3, and a cooperable opening 21 in the mounting plate 7 which receives that member 20. In the example shown, the keying member may include a relatively short post 22 which projects substantially at right angles outwardly from the flat part 19 of the platform undersurface, and a bar 23 connected to or formed integral with the outer end of the post 22 and extending transverse relative to the post 22. The bar 23 preferably projects beyond each of two opposite sides of the post 22 as shown, although it may project beyond one side only if desired. An opening 21 which is substantially complementary in shape to the peripheral shape of the bar 23 is provided through the mounting plate 7 at a suitable location, and the length of the post 22 is related to the thickness of the portion of the plate 7 through which that opening 21 is formed.

The arrangement described above is such that the bar 23 of the keying member 20 can be passed neatly through the mounting plate opening 21 when the platform 3 has a particular position relative to the mounting plate 7. When the opposed surfaces 19 and 18 of the platform 3 and mounting plate 7 engage, the keying member bar 23 is located so that the platform 3 can be turned relative to the mounting plate 7 about the axis of the keying member post 22. In that way, the keying member bar 23 is disposed so as to engage the undersurface of the mounting plate 7 and thereby prevent separation of the platform 3 from the mounting plate 7.

Figure 6:
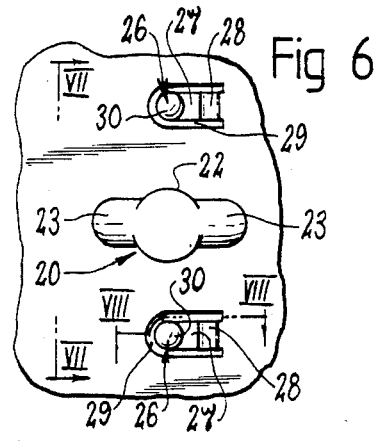
FIG. 6 is a top plan view of part only of the platform shown in FIGS. 1 and 2.

As shown in FIG. 6, it is preferred that the keying member bar 23 is of different size and/or shape on each side of the post 22. If the plate opening 21 is of complementary size and/or shape, the platform 3 will not be connectable with the mounting 2 unless it has a particular position relative to the mounting 2. One advantage of such an arrangement is that frangible detent means as hereinafter discussed can be used.

Figure 7:
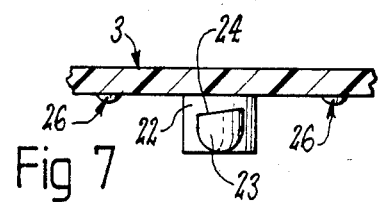
FIG. 7 is cross-sectional view taken along line VII-—VII of FIG. 6.

It is further preferred, as shown by FIG. 7, that the upper surface of each part of the bar 23 has a sloping or camming portion 24. That portion 24 serves to facilitate movement of the plate 7 into the space between the bar 23 and the main body of the platform 3, while enabling relatively firm engagement between the plate 7 and platform 3 when those components are properly connected as shown in FIG. 2.

Figure 2:
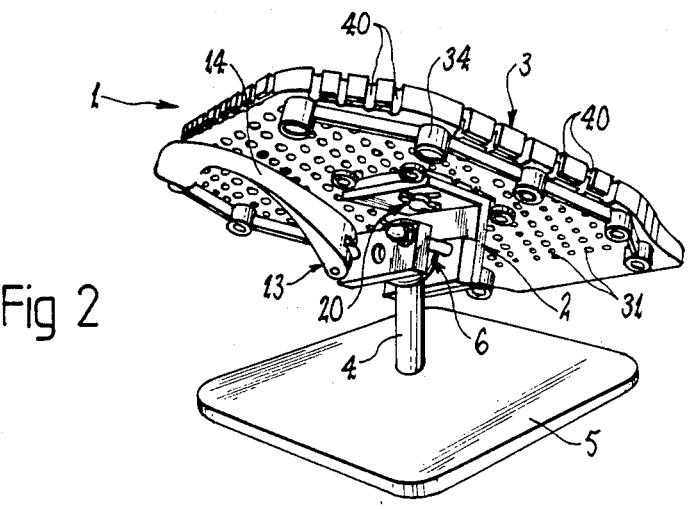
FIG. 2 is a view similar to FIG. 1 but showing the platform connected to the mounting structure.
Figure 8:
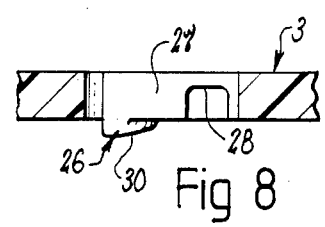

If desired, detent means may be provided to resist movement of the platform 3 out of the operative position as shown in FIG. 2. One such detent means as shown in FIGS. 7 and 8 of the drawings includes a pair of recesses 25 in the upper surface of the mounting plate 7 and a pair of projections 26 on the opposed surface of the platform 3 which snap engage with those recesses 25 and which can be forced out of the recesses 25 by applying sufficient torque to the platform 3. Preferably, as indicated above, the keying member bar 23 bears against the mounting plate undersurface to provide some frictional resistance to relative turning movement of the platform 3 and to also hold the platform 3 firmly against the upper surface 18 of the mounting plate 7.

In the particular arrangement shown in FIGS. 6 to 8, each detent projection 26 forms part of a frangible component which serves to indicate whether the platform has been previously used. According to the arrangement shown, each projection 26 is provided at an end of an arm 27 which is connected at its opposite end to the platform 3 through a weakened zone 28. Actually, each arms 27 is formed integral with the platform 3 and clearance 29 is provided on each side of the arm 27 so that it can move laterally relative to the body of the platform 3. The surface 30 (FIG. 8) of each projection 26 is so shaped (e.g., inclined as shown) that the arm 27 can be cammed outwards away from the upper plate surface 18 when the platform is being moved towards its operative position at which the respective projections 26 snap into one of the plate recesses 25 because of the resiliency of the arms 27. When the platform 3 is rotated back from that operative position, 25 however, the shape of the surfaces 30 (e.g. its direction of slope) is such that the projections 26 do not readily cam out of their recesses 25 so that the arms 27 are strained and at least one arm 27 will fracture at the zone 28. Such a visible sign of prior use of the platform 3 can be useful in situations where reuse is to be avoided for purposes of hygiene.

It will be appreciated that in the arrangement described, there need only be one projection 26 and cooperable recess 25. It will also be apparent that the retaining means as described can be modified in many ways. For example, the keying member 20 may be provided on the mounting plate 7 rather than the platform 3. Also, engagement of the retaining means may be effected by relative linear movement of the platform 3 rather than rotational movement as described. Other variations are obviously available.

Figure 9:
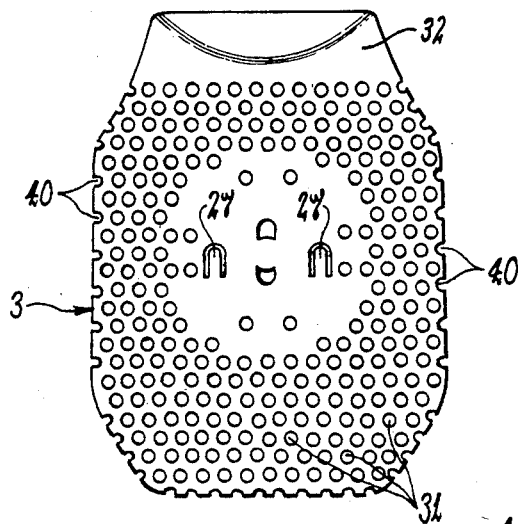
FIG. 9 is a plan view of a typical platform for use with the table of FIGS. 1 and 2.

The platform 3 may be made from any suitable material, but in a preferred arrangement it is moulded or otherwise formed from a plastics material. Any appropriate peripheral shape may be adopted for the platform 3, but it is usually convenient to have the platform 3 of generally rectangular shape, with perhaps a progressive reduction in width at each of the two opposite end portions as shown in FIG. 9. A plurality of holes 31 are formed at least through a major part of the platform 3 to provide locating means for the aforementioned column supports. In an alternative arrangement, recesses could be provided in the platform 3 to act as locators for the column supports, but through-holes are preferred as those holes can also function as drainage holes for liquid and other material. The holes 31 are preferably of circular cross-section, but other cross-sectional shapes could be adopted.

It is preferred that locator holes 31 are not provided through the central region 19 of the platform 3 which overlies the mounting plate 7. One end portion 32 of the platform 3 may also be imperforate and that end portion 32 is preferably contoured to provide a comfortable resting surface for the wrist area of a person's arm.

Figure 10:
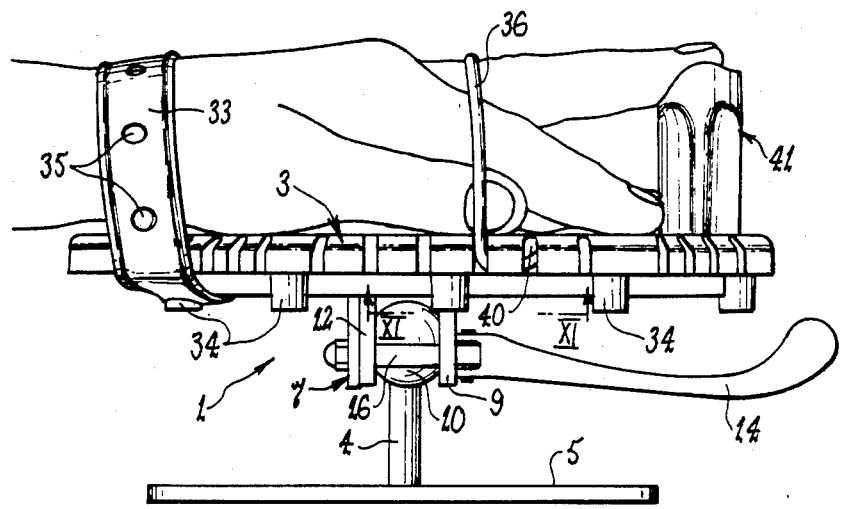
FIG. 10 is a side elevational view of a table as shown in FIGS. 1 and 2 when used in a particular fashion.

Any suitable means may be employed to hold a hand against the upper surface of the platform. It is usually convenient, however, to use flexible straps 33 for that purpose (FIG. 10). Each such strap 33 may be in the form of an elongate band and the platform may be provided with means for cooperating with such straps 33. In the example shown, such cooperating means comprises a plurality of discrete projections 34 on the undersurface of the platform 3 and at least some of which are located adjacent the periphery of the platform 3. Each strap 33 has a plurality of holes 35 provided at spaced intervals along its length, and each hole 35 is adapted to neatly receive a projection 34 so as to secure the strap 33 in a selected position. Opposite end portions of the strap 33 can therefore be secured to respective side portions of the platform 3.

Figure 11:
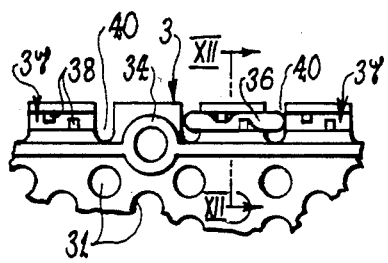
FIG. 11 is an underneath plan view of a perimeter portion of the platform shown in FIG. 9.
Figure 12:
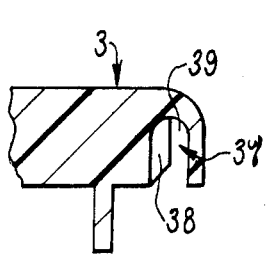
FIG. 12 is a cross-sectional view taken along line XII—XII of FIG. 11.
Figure 13:
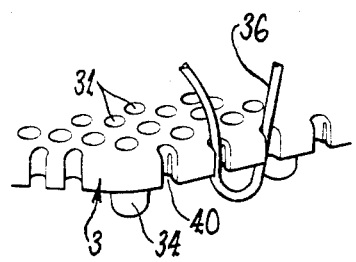
FIG. 13 is a perspective view of part only of the perimeter of shown in FIG. 9.
Figure 16:
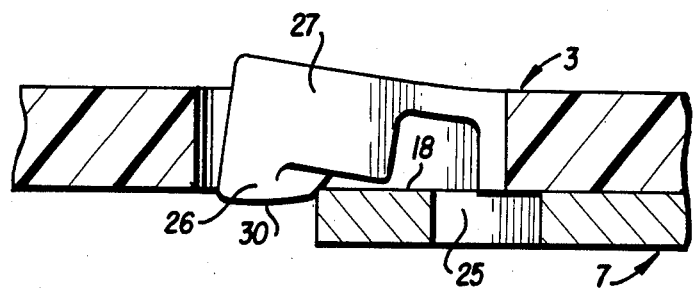
FIG. 16 is a view similar to FIG. 7 but on an enlarged scale showing details of the engagement between the platform and the base.
Figure 17:
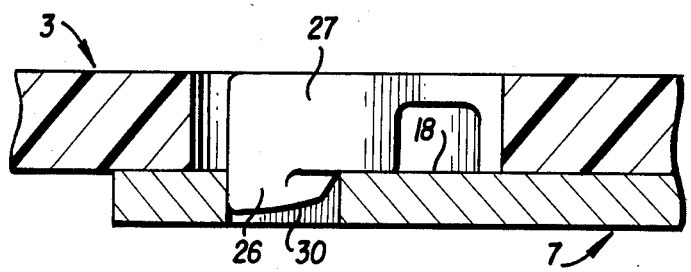
FIG. 17 is a sectional view similar to FIG. 16 but showing the frangible component snapped into place after engagement of the platform with the base.

Further holding means may be provided in the form of an elongate section of elastic material such as at least one length of silicone tubing 36 (FIG. 10). Such a length of tubing 36 can be secured to the platform in a selected position by means of perimeter camming recesses 37 as shown in FIGS. 11 and 12. Each such recess 37 has two oppositely facing ribs 38 arranged therein so as to provide two narrow slots 39 on respective opposite sides of the recess 37. Those slots 39 have a width less than the undistorted diameter of the tubing 36 so that the tubing 36 is flattened when forced into such a slot 39 as shown in FIG. 11. Access slots 40 provided around the periphery of the platform 3 facilitate use of the camming recesses 37 as shown by FIG. 13.

A length of tubing 36 can also function as a retractor by attaching a suitable hook (not shown) for example, to an end of the tubing 36. That is, the hook is engaged with the skin or flesh of a person's hand located over the table while a remote portion of the tubing is secured by one of the camming recesses 37.

Figure 14:
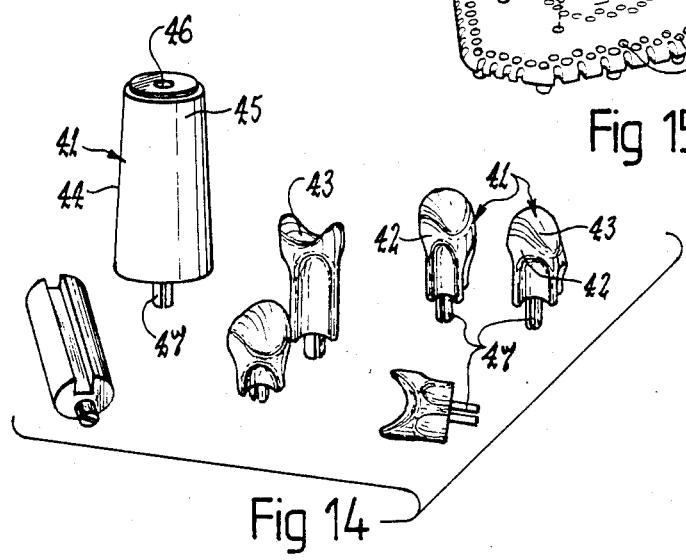
FIG. 14 shows a typical set of column supports for use with the table 1 and 2.

Column supports 41 are arranged so as to be positionable on the platform 3 as required and each such column support 41 can be formed so as to perform a particular function. That is, there may be several column supports 41 of various length and the upper end 42 of at least some of the supports can be contoured to provide a finger resting channel 43, or otherwise arranged as required. A typical set of column supports 41 is shown in FIG. 14. Column supports 41 which are intended to support a finger may be grooved at the upper end 42 as shown to provide a concave channel 43 or recess within which a finger can be located. The open mouth of the channel 43 could face directly upwards as shown or to one side according to requirements.

Other column supports 41 may be adopted to engage against another part of the hand and can be shaped accordingly.

One type of column support 41, which is identified by reference numeral 44 in FIG. 14, can be used as either a lateral support or an extension piece for another support 41. That is, one or more of the supports 44 can be located on the platform 3 so as to hold a hand against lateral shifting. Alternatively, such a support 44 can have a contoured support 41 attached to its upper end 45, and an attaching hole 46 is provided for that purpose.

Figure 15:
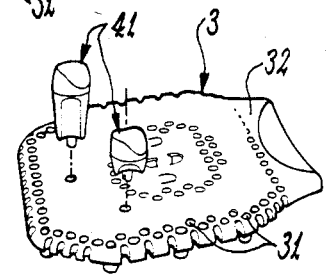
FIG. 15 is an isometric view showing the platform of FIG. 9 and some of the column supports of FIG. 14 as arranged for cooperative engagement.

Each column support 41 may have a peg 47 projecting from its lower end for location within any one of the holes 31 in the platform 3. When a column support 41 is so located on the platform 3, it can be rotated about its longitudinal axis and that enables optimum arrangement of the channel 43 in the upper end 42, assuming the column support 41 has such a channel 43. It is possible to provide a large number of locating holes 31 through the platform 3 and thereby enable a large selection of positions or stations for each column support 41 (see FIG. 15). As a result, column supports 41 of various lengths and forms can be arranged as required over the platform 3 so as to achieve a particular posture for a hand to be held over that platform 3.

The ability to arrange column supports 41 of selected form as required over the platform 3 in effect provides a platform 3 of almost infinitely variable contour which gives firm support to a hand. In addition, the elevation of a part or parts of a hand above the body of the platform 3 facilitates access to the hand for surgery purposes.

Column supports 41 as described can be moulded or otherwise formed from a plastics material and because of their relatively low cost could be disposable if that was thought desirable to ensure high standards of cleanliness. The platform 3 may also be disposable for the same reason, especially as the relatively complex shape of that component makes it difficult to clean between uses.

It will be apparent from the foregoing description that a table according to the invention provides an effective and easy to operate support for a hand. The construction is exceedingly simple and yet enables adoption of both a general disposition and a particular posture for a hand to be operated upon.

Various alterations, modifications and/or additions may be introduced into the constructions and arrangements of parts previously described without departing from the spirit or ambit of the invention as defined by the appended claims.

I claim:

1. A hand surgery table including, a base, a platform having an upper surface, mounting means connecting the platform to the base and being adjustable to permit movement of said platform relative to the base so that the inclination of said upper surface relative to horizontal plane can be varied, locking means operable to releasably hold said mounting means in a selected position of adjustment, a plurality of stations provided across said platform, locating means at each said station, and means for supporting fingers of a patient including a plurality of column supports at least one column support being releasably attachable to said platform at any one of said stations, said column support having a locating part at a lower end thereof and a supporting part at an upper end thereof, said locating part being cooperable with said locating means of a selected said station so as to hold said at lost one column support in an operative position at which it projects outwardly from said upper surface, and said supporting part is thereby positioned outwardly from said upper surface wherein an upper end of said at least one column support is contoured to provide a finger resting surface, and said finger resting surface forms said supporting part of said at least one column support to thereby support that hand portion at a position relative to said upper surface.

2. A table according to claim 1, wherein each said locating means is a hole formed in said upper surface and said locating part is a peg projecting from the lower end of said at least one column support and which is locatable in a said hole.

3. A table according to claim 2, wherein said peg is substantially cylindrical and is adapted for rotatable location in a said hole so that said at least one column support can be turned about a longitudinal axis relative to said platform.

4. A table according to claim 2, wherein at least some of said holes extend completely through said platform so as to also serve as drainage holes.

5. A table according to claim 1, wherein at least one said column support functions as an extension member for connection between said platform and said contoured column support.

6. A table according to claim 1, including retaining means which releasably connects said platform to said mounting means to enable removal of said platform for cleaning or disposal.

7. A table according to claim 6, wherein said retaining means includes a keying member on said platform and a cooperable opening in said mounting means, said keying member is cooperable with said mounting means so as to permit rotation of the platform relative to the mounting means about an axis extending transverse to the upper surface of the platform, and is operable to allow said platform to be removed from the mounting means when the platform is in a particular position of rotation relative to the mounting means and to prevent separation of said platform and mounting means when said platform is rotated away from that particular position.

8. A table according to claim 7, including detent means on said platform which is cooperable with said mounting means to resist rotation of said platform relative to the mounting means from an operative position towards said particular position.

9. A table according to claim 8, wherein said detent means includes a frangible component which at least partly separates from said platform when the platform is rotated from said operative position towards said particular position.

10. A table according to claim 1, wherein said mounting means includes a ball joint connecting the platform to the base.

11. A table according to claim 10, wherein said locking means includes a releasable clamp which is operable to secure said ball joint against movement.

12. A table according to claim 1, including releasable holding means for securing part of a person's body against movement relative to said platform.

13. A table according to claim 12, wherein said holding means includes at least one elongate strap having a plurality of apertures therethrough, said platform has a plurality of pins projecting below an undersurface thereof, and each said pin is receivable in a said strap hole so as to hold said strap in a selected position.

14. A table according to claim 12, wherein said holding means includes a plurality of recesses provided in the undersurface of said platform at locations around the periphery of the platform, a plurality of access slots in said periphery, and at least one elongate flexible tying member which can have a portion thereof wedged in a selected said recess and which can extend from that recess through an adjacent said access slot and across the upper surface of the platform.

* * * * *